Patented June 18, 1940

2,204,970

UNITED STATES PATENT OFFICE 2,204,970

DYESTUFF INTERMEDIATES OF THE ANTHRAQUINONE SERIES

William L. Rintelman, Carrollville, Wis., assignorto E. I. du Pont de Nemours & Company, Wilmington, Del., a corporation of Delaware No Drawing. Application November 25, 1936, Serial No. 112,704

3 Claims. (Cl. 260—303)

This invention relates to the preparation of new and valuable dyestuff intermediates of the anthraquinone series and more particularly to the preparation of new C-aryl-1,2-anthraquinonethiazoles and oxazoles of the general formula

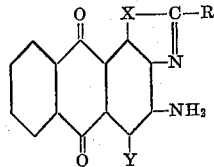

wherein X stands for sulfur or oxygen, Y stands for halogen or hydrogen, and R stands for an aryl radical of the benzene, naphthalene or anthraquinone series.

I have found that new and valuable vat dyestuff intermediates can be prepared from 3-halogen-C-aryl-1,2-anthraquinonethiazoles or oxazoles by amidation and by further halogenation of the resulting amino compound. According to this invention the 3-halogen-C-aryl-1,2-anthraquinonethiazole or oxazole is reacted with p-toluenesulfonamide in an inert high-boiling solvent and in the presence of an acid binding agent and a copper catalyst. The resulting p-toluoylsulfonamido-C-aryl-1,2-anthraquinoneazole is then hydrolyzed to the free amine, which in turn may be brominated or chlorinated to give 3-amino-4-halogen-C-aryl-1,2-anthraquinonethiazole or oxazole, respectively. These intermediate compounds are particularly suitable for the preparation of C,C-diaryl-1,2,4,3-anthraquinonedithiazoles and dioxazoles, and they may also be used for condensation with other amine or halogen compounds to produce new and valuable dyestuffs.

The following examples are given to more fully illustrate the invention. The parts used are by weight.

Example 1

112 parts 3-bromo-C-phenyl-1,2-anthraquinonethiazole are dissolved in a mixture of 550 parts molten naphthalene, 50 parts potassium carbonate, 65 parts p-toluenesulfonamide and 2.5 parts copper bronze, slowly heated to 205° C. and held at this temperature for 8 hours. The reaction mass becomes thick with long bronze colored needles. The product is isolated by dilution with 1000 parts o-dichlorobenzene and filtered at 150° C. The cake is washed free of solvent and salts with alcohol and hot water, and then dried. 3-chloro-C-phenyl - 1 , 2 - anthraquinonethiazole may be used in the same manner except that the time of heating should be increased to 24 hours to insure complete reaction. The 1,2-phenylthiazole-3-p-toluenesulfonamide (probably as the potassium salt) is composed of orange needles which dissolve in 95% sulfuric acid imparting to it an olive coloration. On diluting with water and warming to 100° C. the red 3-amino-C-phenyl-1,2-anthraquinonethiazole is precipitated. The 3-p-toluenesulfonamido-C-phenyl-1,2-anthraquinonethiazole as obtained is insoluble in hot nitrobenzene and other high boiling solvents but is soluble in cold nitrobenzene in the presence of anhydrous aluminum chloride and forms a pale greenish yellow solution.

Example 2

The 3-p-toluenesulfonamido-C-phenyl-1,2-anthra-quinoneoxazole may also be made under the conditions set forth in Example 1. It crystallizes in orange needles which are soluble in 95% sulfuric acid with a yellow coloration. It is insoluble in hot nitrobenzene but soluble cold in the presence of anhydrous aluminum chloride with a reddish yellow coloration. The orange colored needles are probably the potassium salt of the imide. The free imide is yellow in color and is formed by acidifying the orange colored crystals.

Example 3

120 parts 3-p-toluenesulfonamido-C-phenyl-1,2-anthraquinonethiazole are dissolved in 1000 parts 100% sulfuric acid. 300 parts water are slowly added, the temperature being allowed to rise to 80° C. and held at this temperature for about 3 hours. The solution is drowned in 10,000 parts cold water and the precipitated 3-amino-C-phenyl-1,2-anthraquinonethiazole which comes out in red flocks is filtered off and washed acid-free and dried. The product is a red amorphous body which is soluble in hot nitrobenzene with a deep yellow coloration from which it crystallizes in orange needles on cooling. It dissolves in cold nitrobenzene with a red coloration in the presence of anhydrous aluminum chloride.

Example 4

The 3-amino-C-phenyl-1,2-anthraquinoneoxazole is obtained as in Example 3 when the corresponding p-toluenesulfonamide (obtained as in Example 2) is hydrolyzed. It is an orange body which dissolves in hot nitrobenzene with a yellow color and is precipitated in pale orange needles on cooling.

Example 5

25 parts of the 3-amino-C-phenyl-1,2-anthraquinoneoxazole are dissolved in 250 parts 100% sulfuric acid poured into 2500 parts cold water. 30 parts liquid bromine are added and the suspension agitated at room temperature for 10 to 12 hours, then heated to a boil to remove the excess bromine. The orange precipitate is filtered off and washed acid-free and dried.

The product, which is the 3-amino-4-bromo-C-phenyl-1,2-anthraquinoneoxazole, dissolves in sulfuric acid (95%) with a light red color which turns to a deeper red (wine color) when p-formaldehyde is added. It dissolves in hot nitrobenzene with a yellow coloration and crystallizes in yellow needles on cooling. In cold nitrobenzene with anhydrous aluminum chloride it forms a wine colored solution. The product condenses with itself in nitrobenzene with soda ash and copper chloride to give gray colored needles which have a difficulty soluble vat. It dyes cotton in bluish green shades.

Example 6

3-amino-C-phenyl-1,2-anthraquinonethiazole is brominated under the same conditions as Example 5 to give the 3-amino-4-bromo-C-phenyl-1,2-anthraquinonethiazole. This is somewhat darker in color than the oxazole. It dissolves in hot nitrobenzene to give a yellow-brown solution which on cooling deposits slender yellow bars. When anhydrous aluminum chloride is added, the crystals redissolve (in the cold) to form a wine-red colored solution. The compound condenses with itself in nitrobenzene, in the presence of copper chloride and sodium carbonate, to give green needles which vat with difficulty giving a reddish violet vat from which cotton is dyed in yellowish green shades.

Example 7

25 parts 3-amino-C-phenyl-1,2-anthraquinonethiazole in finely divided form is suspended in 500 parts concentrated hydrochloric acid (30° Bé.) and cooled to 20° C. 3.5 parts sodium chlorate are added slowly, over a period of 3 to 4 hours, and the suspension is stirred for 18 hours longer and filtered. The cake is washed acid-free and dried. The orange amorphous powder is mainly 3-amino-4-chloro-C-phenyl-1,2-anthraquinonethiazole. It dissolves in hot nitrobenzene to give a yellow-brown solution. In sulfuric acid (95%) it dissolves to a yellow-brown solution.

Example 8

425 parts 1-mercapto-(sodium salt) 2-amino-3-bromoanthraquinone (wet press cake), obtained from 150 parts 1,3-dibromo-2-aminoanthraquinone by fusion with alcoholic sodium polysulfide solution, are dehydrated in 1500 grams o-dichlorobenzene by heating slowly to a temperature of 175° C. The dry suspension is cooled to room temperature and 100 parts 2-chloro-3-naphthoylchloride are added and the suspension reheated to 175° C. and held at this temperature for a period of 6 hours, or until the reaction is complete. When the reaction is completed the mass is cooled to room temperature and filtered, washed, first with alcohol and then with hot water. The cake is dried and may be purified by dissolving in 20 parts boiling nitrobenzene and filtering the hot solution. On cooling the filtrate greenish yellow crystals are deposited.

10 parts of this material are heated to a boil for several hours in 100 parts nitrobenzene with an excess of p-toluenesulfonamide and potassium carbonate with cuprous chloride as a catalyst. After a short time dark red needles are deposited and may be collected by filtering the hot liquor. The crystals are washed with alcohol to remove the nitrobenzene and then with hot water to remove the inorganic salts. The dark red crystalline body thus obtained appears to be the potassium salt of the sulfonamide condensation product, for it turns yellow on being treated with hot hydrochloric acid. The p-toluenesulfonamide compound gives a dark red vat with alkaline hydrosulfite.

The free amine is obtained by dissolving the p-toluenesulfonamide compound in 10 parts of 95% sulfuric acid, heating the solution to 90–100° C. for ½ hour and then precipitating by the addition of water and filtration.

The dry amine is a red-orange compound. It vats with a dark red vat from which cotton is dyed in orange shades which are fast to bleach and chlorine. It is slightly soluble in hot nitrobenzene. On cooling the solution orange crystals are formed. It is soluble in cold nitrobenzene in the presence of anhydrous aluminum chloride, giving a red solution.

Example 9

100 parts of the 3-bromo-C-anthraquinonyl-1,2-anthraquinonethiazole, obtained by condensing anthraquinone-beta-carbonyl chloride with 1-mercapto-(sodium salt) 2-amino-3-bromoanthraquinone in a hot solvent such as o-dichlorobenzene, are heated slowly in 1000 parts nitrobenzene to 200° C. with 50 parts of p-toluenesulfonamide, 50 parts potassium carbonate and 1 part cuprous chloride, and held at this temperature for 8 hours. Red crystals begin to separate after about 1 hour's heating at 200° C. The magma is cooled to 100° C. and filtered at this temperature, washed with alcohol and then with hot water. The dark red crystalline body obtained turns to a greenish yellow compound when boiled with dilute hydrochloric acid. It vats with a reddish brown colored vat.

70 parts of this p-toluenesulfonamide compound are dissolved in 700 parts 95% sulfuric acid. The temperature is made to rise to 80–85° C. by the addition of water (about 55 cc.) and held at this temperature for ½ hour. The hot acid solution is then drowned in a large volume of water and filtered, washed acid-free and dried.

The free amine thus obtained is a dark red amorphous powder which dissolves in 95% sulfuric acid with a greenish yellow color. It vats with a strong yellow-brown vat and dyes cotton strong reddish yellow shades after oxidation, which are fast to bleach and chlorine. The product is slightly soluble in boiling nitrobenzene with a yellow solution. On cooling, orange crystals are deposited which redissolve in the cold to give a yellow-brown solution, when anhydrous aluminum chloride is added.

Example 10

90 parts crude 1-bromo-2-amino-3-anthraquinonesulfonic acid sodium salt are treated at a boil in 1500 parts 50% alcohol, for 3 hours, with 26 parts 100% sodium sulfide and 11 parts sulfur. The strong bluish violet solution is diluted to a volume of 3000 cc. with cold water and while being rapidly agitated 40 parts benzoyl chloride are slowly added. A yellow precipitate forms almost immediately. The precipitate is stirred for several hours, then filtered, washed with 500 cc. 10% sodium chloride solution and dried. The 1,2 - benzthiazole-3-anthraquinone-sulfonic acid sodium salt thus obtained is a yellow compound soluble in hot water, giving a yellow solution. It forms a wine-red solution when sodium hydrosulfite is added. It is soluble in 95% sulfuric acid forming a green-yellow solution.

Instead of condensing the mercaptan with benzoyl chloride in aqueous solution the sodium salt of the mercaptan body may be isolated by salting to 25% concentration with sodium chloride and filtrating, and then by condensing with benzaldehyde in sulfuric acid solution to give the 1,2 - benzthiazole - 3 - anthraquinonesulfonic acid.

The crude sulfonic acid body or sodium salt as obtained above is charged into an autoclave with 700 parts 26% ammonium hydroxide and 8 parts sodium chlorate. It is then heated to a temperature of 180–182° C. and held for 18 hours. The cooled reaction charge is filtered and washed alkali-free with hot water, and dried. The 3-amino-C-phenyl-1,2-anthraquinonethiazole is obtained as a brown powder which may be purified by extraction with hot solvents such as nitrobenzene. When purified it is identical with the product of Example 2.

The 3-bromo-C-aryl-1,2-anthraquinonethiazoles and oxazoles used as the starting material in the above examples may be prepared from the 1,3-dibromo-2-aminoanthraquinone by methods disclosed in the prior art, as more particularly illustrated in Examples 8 and 9. As illustrated in Example 10, the 3-amino-C-aryl-1,2-anthraquinonethiazole may also be prepared from the 1-bromo-2-amino-3-anthraquinonesulfonic acid sodium salt.

Bromination and chlorination of the 3-amino-C-aryl-1,2-anthraquinonethiazoles may be carried out by any of the usual bromination and chlorination methods.

I claim:
1. The new C-aryl-1,2-anthraquinonethiazoles and oxazoles of the following formula

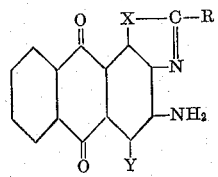

wherein X stands for an element of the class consisting of sulfur and oxygen, Y stands for an element of the class consisting of hydrogen and halogen and R stands for an aryl radical of the class consisting of those of the benzene, naphthalene, and anthraquinone series.

2. As new compounds, C-phenyl-1,2-anthraquinonethiazoles and oxazoles of the following formula

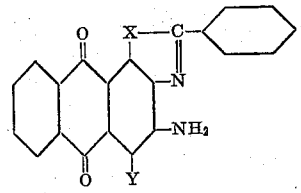

wherein X stands for an element of the class consisting of oxygen and sulfur and Y stands for an element of the class consisting of halogen and hydrogen.

3. As new compounds, C-phenyl-1,2-anthraquinonethiazoles of the following formula:

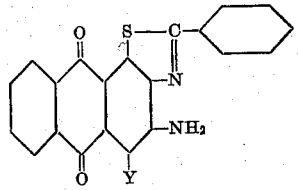

wherein Y stands for an element of the class consisting of halogen.

WILLIAM L. RINTELMAN.